Sept. 14, 1926.
G. W. DOVER
1,599,611
TURNING OR BORING TOOL
Filed Dec. 24, 1924      2 Sheets—Sheet 2
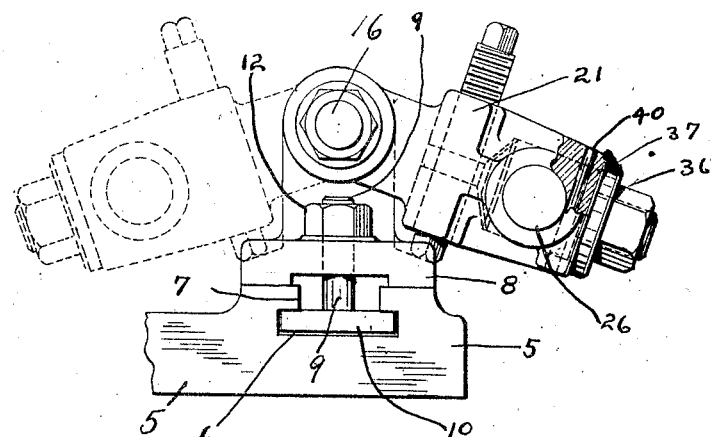
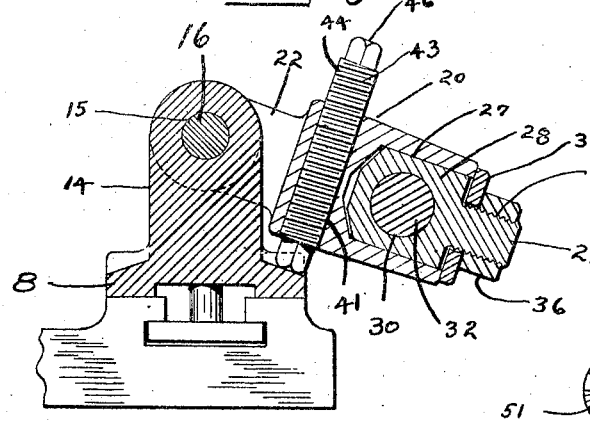
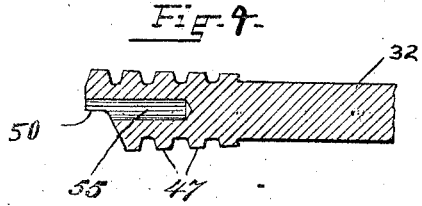
INVENTOR:
George W. Dover
By Perley H. Heart
ATTORNEY:

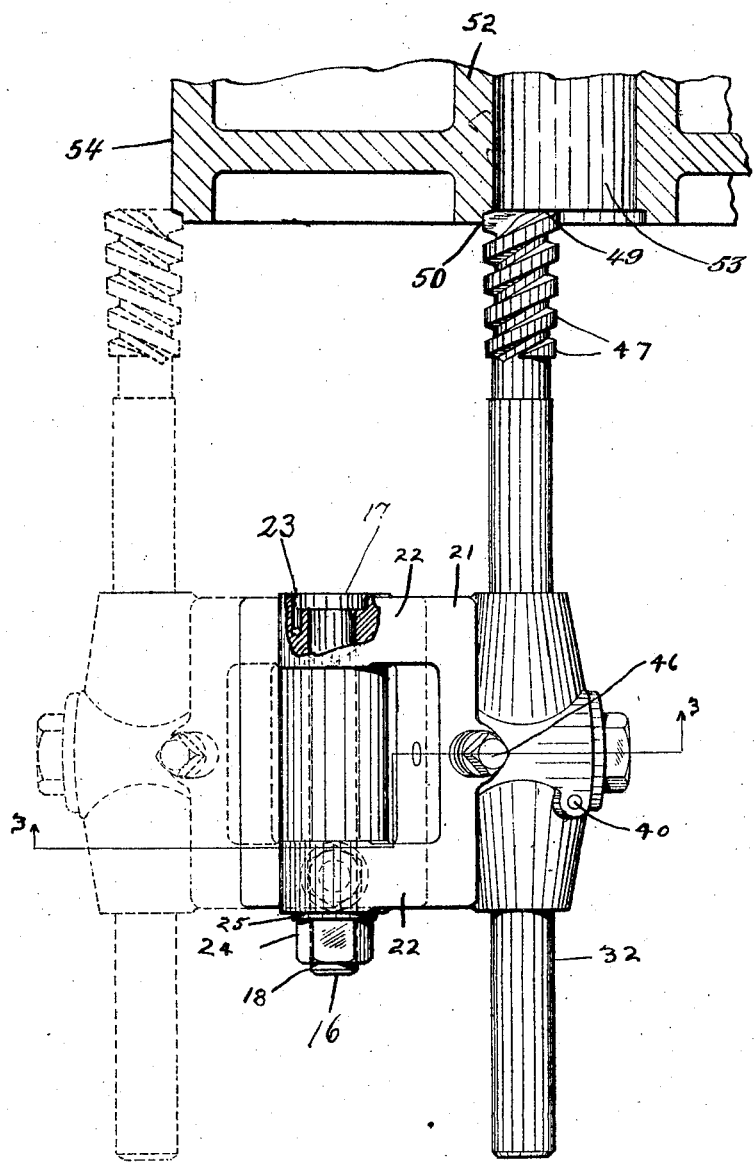

Patented Sept. 14, 1926.

1,599,611

UNITED STATES PATENT OFFICE.

GEORGE W. DOVER, OF LONGMEADOW, RHODE ISLAND, ASSIGNOR TO THE MONTGOMERY TOOL AND MACHINERY COMPANY, A CORPORATION OF RHODE ISLAND.

TURNING OR BORING TOOL.

Application filed December 24, 1924. Serial No. 757,914.

This invention relates to an improved turning or boring tool adapted for mounting upon the slide rest of a lathe or upon the table of a milling machine for the purpose of boring holes and turning diameters.

One object of the invention is to provide a tool for boring or enlarging the inside and turning the outside of cylindrical work without change of location of the holder, and for boring a hole of larger diameter than the bit.

Another object of the invention is to provide means for readily adjusting the cutting tool to any desired vertical position, as well as means for firmly securing the cutting tool in operative position so as to avoid "chattering".

Another object of the invention is to provide a tool having a double bit whereby the preliminary roughing and final finishing of the work may be accomplished with the same bit thereby making it unnecessary to regrind the bit between the roughing and finishing operations.

Other objects and advantages of the invention relate to various improved details of construction and modes of operation as will be more fully described in the detailed description to follow.

In the accompanying drawings which form a part of this application:—

Fig. 1 is a top plan view of my novel turning tool showing in transverse section a pulley upon which the tool is operating, and showing in broken lines a second position of the tool, Fig. 2, an end elevation of the tool, Fig. 3, a section taken on line 3—3 of Fig. 1, Fig. 4, a longitudinal section of the boring tool, and Fig. 5, an end elevation of the same.

Like reference characters indicate like parts throughout the views.

My improved tool in its present and preferred form of construction is shown in connection with the tool post or the cross slide 5 of an ordinary lathe in which is the usual T slot comprising the horizontal channel 6 and vertical portion 7. A base plate 8 is adapted to rest upon the slide 5, and is engageable therewith by bolts 9 whose lower ends are fast in an oblong plate 10 located in the channel 6. Nuts 12 upon the threaded ends of the bolts rest upon the upper face of the base near its ends.

Integral with the base plate 8 is a block 14 provided with a longitudinal bore 15 in which is a pivot member 16 provided with a head 17 at one end and with a thread 18 on the other end.

A support 20 is provided comprising a body portion 21 and arms 22, which are adapted to overlie opposite ends of the block 14, the arms 22 being each provided with openings for the reception of the pivot member 16. One of the arms 22 is non-rotatably secured to the head 17 of the pivot member 16 by a locking pin 23. A clamping nut 24 provided with a washer or clamping plate 25 is located upon the threaded portion 18 of the pivot member. This washer is movable by the nut into engagement with one of the ears 23 to tighten or loosen the member 20 and lock the same when desired in any axial position relative to the block 14. The body 21 of the support 20 is provided with a horizontal bore 26 parallel with the pivot member 17 and is provided with a recess 27 extending across the bore 26. Slidably mounted in this recess is the body 28 of a binding bolt having a stem 29 and provided with an opening 30 in alignment with the bore 26. The body 28 is slightly shorter than the depth of the recess 27 in order to create a clamping effect upon a bit stock 32 which fits slidingly in the bores 26 and 30. The stem 29 is provided with a thread 35 engaging a nut 36 resting against a washer 37 which abuts against the end of the body 21 and overlies the open end of the recess 27. In the present instance a locking pin 40 is fast in the body and loosely engages a recess in one side of the binding bolt 28 to prevent rotation or accidental removal of the bolt 28 when the bit stock 32 is removed.

The body 21 is provided with a threaded opening 41 in which is threaded a rod 43 provided with a thread 44 adapted to engage the thread of the opening 41. The ends of the rod have angular or squared portions 46. This rod is adjustable in both directions and under normal or operating conditions one or the other of its ends rests upon the base 8. The bit stock 32 is provided at one end with a double thread 47 terminating in oppositely positioned cutting edges 49 and 50. The bit proper may be formed integral with the stock 32 as shown or the bit stock may be so formed that a plurality of separate bits may be secured thereto and firmly held thereby.

In the operation of my improved turning tool the work which is designated by the numeral 52, and which is provided with a central bore 53 and has an outer cylindrical surface 54, is advanced towards the bit 32. Whereupon the support 20 is turned into the full line position as shown in Fig. 1, the rod 43 rotated sufficiently to bring the bit stock 32 into the proper vertical position for cutting and the bit stock 32 rotated until one of the cutting edges 49 or 50 is in the proper position for engaging the metal surrounding the central bore 53. The nuts 36 and 24 are then firmly seated to securely hold the bit stock 32 against rotation and the support 20 against movement relative to the block 14. The work may then be rotated, the cutting tool operating to enlarge the bore 53. The cutting edge 49 or 50 may be employed for turning the metal or they may be employed alternately, as for roughing and finishing or in the event of the tool being used for boring both cutting edges may be employed.

When it is desired to turn the outer surface of the work, the nuts 24 and 36 are loosened, the support 20 rotated about the pivot member 16 into the dotted line position shown in Fig. 1.

The bit stock 32 is then removed and another substituted therefor provided with a bit adapted for use in making a left handed cut. The bit stock is adjusted to bring the cutting edge into proper position and the rod 43 rotated to properly position the cutting edge vertically with reference to the surface to be cut. The nuts 36 and 24 are then tightened and the tool is in position for the work to be advanced to turn the outer surface of the work. When necessary the cross-slide 5 may be adjusted to bring the cutting edge into proper operative position relative to the work.

What I claim is:—

1. In a structure of the character described, a block, a pivot member carried by said block, a tool support carried by said pivot member and provided with a bore extending therethrough, and a recess communicating with the bore in said support, a clamping bolt positioned in said recess and provided with a bore adapted to register with the bore in said support, a tool provided with a shank positioned within the bores in said support and said clamping bolt, and means for tensioning said clamping bolt to firmly clamp said tool shank in the bores and hold the same against movement relative to said support.

2. In a structure of the character described, a supporting block, a pivot member carried by said block, a tool support carried by said pivot member having an exterior face and movable into various adjusted positions relative to said block, and provided with an opening extending therethrough and a recess communicating with the opening, a clamping member positioned in said recess and provided with an opening registerable with the opening extending through said support, a cutting tool provided with a shank fitting within the registerable openings in said support and clamping member, a threaded extension carried by said clamping member and extending beyond the face of said support, and means for engaging the threaded extension of said member to firmly clamp the tool shank to said support.

3. In a structure of the character described, a block, a pivot member carried by said block, a tool support carried by said pivot member and movable into a variety of adjusted positions relative to said block, a tool carried by said support and movable therewith about said support, the longitudinal axis of said tool being maintained substantially parallel with said pivot member in its various adjusted positions, and a stop member carried by said tool support and engageable with opposite sides of said block to limit the movement of said support relative to said block and form a bearing for said support.

4. In a structure of the character described, a block, a pivot member carried by said block, a tool support carried by said pivot member and movable into a variety of adjusted positions relative to said block, a cutting tool carried by said support and movable therewith about said support, the longitudinal axis of said tool being maintained substantially parallel with said pivot member in its various adjusted positions, and a stop member adjustably mounted in said support and extending from opposite sides thereof to engage portions of said block on opposite sides of the pivot member and furnish an adjustable support for said tool supporting member.

5. In a structure of the character described, a block, a cutting tool pivotally supported by said block and movable into a plurality of adjusted positions relative thereto, the longitudinal axis of said cutting tool being maintained in substantial parallelism in its various adjusted positions about said block, and an adjustable stop movable into a plurality of adjusted positions relative to said cutting tool for limiting the movement of said cutting tool in either of two directions relative to said block.

6. In a structure of the character described, a block, a supporting member pivotally supported by said block, and movable into a plurality of adjusted positions relative thereto, a cutting tool carried by said support and movable therewith, the longitudinal axis of said cutting tool being maintained in substantial parallelism in its various adjusted positions and a stop carried by said support and movable relative thereto for adjustably limiting the movement of said cutting tool in either of two directions relative to said block.

In testimony whereof I have affixed my signature.

GEORGE W. DOVER.